United States Patent
Kundu et al.

(10) Patent No.: US 8,448,858 B1
(45) Date of Patent: *May 28, 2013

(54) METHOD AND APPARATUS FOR DETECTING SUSPICIOUS ACTIVITY USING VIDEO ANALYSIS FROM ALTERNATIVE CAMERA VIEWPOINT

(75) Inventors: Malay Kundu, Lexington, MA (US); Joshua Migdal, Wayland, MA (US); Vikram Srinivasan, Billerica, MA (US); Matthew Farrow, Canton, MA (US)

(73) Assignee: Stoplift, Inc., Cambridge, MA (US)

( * ) Notice: Subject to any disclaimer, the term of this patent is extended or adjusted under 35 U.S.C. 154(b) by 841 days.

This patent is subject to a terminal disclaimer.

(21) Appl. No.: 12/489,099

(22) Filed: Jun. 22, 2009

Related U.S. Application Data (63) Continuation-in-part of application No. 11/393,370, filed on Mar. 29, 2006, now Pat. No. 7,631,808, which is a continuation-in-part of application No. 11/157,127, filed on Jun. 20, 2005, now Pat. No. 7,516,888.

(60) Provisional application No. 60/666,081, filed on Mar. 29, 2005, provisional application No. 60/581,559, filed on Jun. 21, 2004, provisional application No. 60/627,862, filed on Nov. 15, 2004, provisional application No. 61/074,465, filed on Jun. 20, 2008.

(51) Int. Cl.
*G06K 15/00* (2006.01)
*G06F 17/00* (2006.01)

(52) U.S. Cl.
USPC ............ 235/383; 235/375

(58) Field of Classification Search
USPC ............ 235/375, 379, 383, 385; 705/22–24
See application file for complete search history.

(56) References Cited

U.S. PATENT DOCUMENTS

| | | | | |
|---|---|---|---|---|
| 5,494,136 | A * | 2/1996 | Humble | 186/61 |
| 5,609,223 | A * | 3/1997 | Iizaka et al. | 186/61 |
| 5,965,861 | A * | 10/1999 | Addy et al. | 235/383 |
| 6,974,083 | B1 * | 12/2005 | Kahn et al. | 235/462.14 |
| 7,071,971 | B2 * | 7/2006 | Elberbaum | 348/211.11 |
| 7,416,118 | B2 * | 8/2008 | Throckmorton et al. | 235/383 |

* cited by examiner

*Primary Examiner* — Thien M Le
*Assistant Examiner* — April Taylor
(74) *Attorney, Agent, or Firm* — Chapin IP Law, LLC (57) ABSTRACT

A system performs video identification of items involved with transactions, as captured in video data, and compares this item identification information with transaction data obtained from a transaction terminal such as a point-of-sale register to identify situations that are suspicious and may indicate fraudulent activity or operator error. In particular, the system as disclosed herein utilizes unique camera positions, and can use video data from more than one camera, to perform robust detections of fraudulent or suspicious activities associated with transactions in the transaction area. By obtaining video data originating from at least one video camera that monitors a transaction area, the system can automatically (i.e. no human involvement needed) analyze the video data to track items involved in a transaction in the transaction area. Using this information, the system can compare the video analysis of the tracked items to transaction data produced from a transaction terminal to identify suspicious activity. The system can also create, update and maintain object models for items tracked in a transaction area, in part, to assist in identifying suspicious activity.

18 Claims, 7 Drawing Sheets

METHOD AND APPARATUS FOR DETECTING SUSPICIOUS ACTIVITY USING VIDEO ANALYSIS FROM ALTERNATIVE CAMERA VIEWPOINT

CONTINUATION IN PART AND PROVISIONAL CLAIMS TO PRIORITY

1: This application is a CONTINUATION-IN-PART APPLICATION of earlier filed application entitled "METHOD AND APPARATUS FOR DETECTING SUSPICIOUS ACTIVITY USING VIDEO ANALYSIS" having U.S. Ser. No. 11/393,370, Filed Mar. 29, 2006 now U.S. Pat. No. 7,631,808, which in turn claims priority to the benefit of the filing date of Provisional Patent Application entitled "METHOD AND APPARATUS FOR DETECTING ITEM PASS THROUGH & MISIDENTIFICATION", having U.S. Ser. No. 60/666,081, Filed Mar. 29, 2005. Earlier filed U.S. application Ser. No. 11/393,370 is also a CONTINUATION-IN-PART APPLICATION of earlier filed entitled "METHOD AND APPARATUS FOR AUDITING TRANSACTION ACTIVITY IN RETAIL AND OTHER ENVIRONMENTS USING VISUAL RECOGNITION", having U.S. Ser. No. 11/157,127, Filed Jun. 20, 2005 now U.S. Pat. No. 7,516,888, which in turn claims priority to "METHOD AND APPARATUS FOR AUDITING TRANSACTION ACTIVITY IN RETAIL AND OTHER ENVIRONMENTS USING VISUAL RECOGNITION", Filed Jun. 21, 2004, having U.S. Ser. No. 60/581,559 and "METHOD AND APPARATUS FOR DIGITAL ARCHIVING OF VIDEO", Filed Nov. 15, 2004, U.S. Ser. No. 60/627,862.

2: This application further claims the benefit of the filing date of Provisional Patent Application entitled "METHOD AND APPARATUS FOR DETECTING SUSPICIOUS ACTIVITY USING VIDEO ANALYSIS", having U.S. Ser. No. 61/074,465, Filed Jun. 20, 2008. The entire disclosure, teachings and contents of this provisional application are hereby incorporated by reference herein.

BACKGROUND

Retail establishments commonly utilize point of sale or other transaction terminals, often referred to as cash registers, to allow customers of those establishments to purchase items. As an example, in a conventional department store, supermarket or other retail establishment, a customer collects items for purchase throughout the store and places them in a shopping cart, basket, or simply carries them to a point of sale terminal to purchase those items in a transaction. The point of sale terminal may be staffed with an operator such as a cashier who is a person employed by the store to assist the customer in completing the transaction. In some cases, retail establishments have implemented self-checkout point of sale terminals in which the customer is the operator. In either case, the operator typically places items for purchase on a counter, conveyor belt or other item input area. The point of sale terminals include a scanning device such as a laser or optical scanner device that operates to identify a Uniform Product Code (UPC) label or bar code affixed to each item that the customer desires to purchase. The laser scanner is usually a peripheral device coupled to a computer that is part of the point-of-sale (POS) terminal. To scan an item, the operator picks up each item, one by one, from the item input area and passes that item over a scanning area such as glass window built into the counter or checkout area to allow the laser scanner to detect the UPC code. Once the point of sale computer identifies the UPC code on an item, the computer can perform a lookup in a database to determine the price and identity of the scanned item. Alternatively, in every case where the operator can scan the item, the operator may likewise enter the UPC or product identification code into the terminal manually or through an automatic product identification device such as an RFID reader. The term "scan" is defined generally to include all means of entering transaction items into a transaction terminal. Likewise, the term "scanner" is defined generally as any transaction terminal, automated and/or manual, for recording transaction information.

As the operator scans or enters each item for purchase, one by one, the point of sale terminal maintains an accumulated total purchase price for all of the items in the transaction. For each item that an operator successfully scans or enters, the point of sale terminal typically makes a beeping noise or tone to indicate to the operator that the item has been scanned by the point of sale terminal and in response, the operator places the item into an item output area such as a downstream conveyor belt or other area for retrieval of the items by the customer or for bagging of the items into a shopping bag. Once all items in the transaction are scanned in this manner, the operator indicates to the point of sale terminal that the scanning process is complete and the point of sale terminal displays a total purchase price to the customer who then pays the store for the items purchased in that transaction.

SUMMARY

Conventional systems that provide for purchase of items using a scanner or other automated identification of items via code suffer from a variety of deficiencies. In particular, operation of such systems can be compromised either knowingly or unknowingly by an operator in a manner that allows a customer to receive possession of one or more items without paying for them. In particular, such systems are susceptible to "pass-throughs", also know as "sweethearting" in which an operator purposefully or accidentally fails to scan an item as that item moves through the transaction area. In such cases, the POS system never detects the un-scanned item and the item is thus never totaled into the purchase price. In such cases, the customer effectively receives the item for free. Retail chains lose millions of dollars a year to operator error or fraudulent activity of this nature.

In a non-fraudulent example, an operator may unknowingly pass an item through the scanning area during a transaction and place the item into the item output area such as a downstream conveyor belt, but no scan of the item took place. Perhaps the operator was not paying attention and did not notice (or did not care) that the scanner failed to beep during scanning of an item.

As an example of sweethearting that represents fraud on the retail establishment, an operator who may be assisting a customer who is personally known to the operator (e.g. a friend or conspirator of the operator) intentionally causes the POS system to either not scan the item as the operator moves the item through the transaction area, such as by covering the UPC label with their hand or moving the UPC code out of range of the scanner. In such situations, the item is included with other items that may or may not have also been scanned, and the customer or operator continues along as if nothing wrong happened. After the operator processes all items in the transaction, either via actual scanning which is often done for the less expensive items to make the transaction look legitimate to anyone who may be watching, or via sweethearting in which case the item not scanned is grouped with items that appear to have be scanned, the customer pays the operator a purchase price reflecting only the sum total of all scanned and entered items. After paying, the customer removes all items, scanned/entered and un-scanned, from the store, having only paid for those items that were scanned or entered.

In another fraudulent example know as label switching, the operator causes the POS system to scan an item that is different that the item being passed through the scanning area during the transaction. In such cases, a customer or operator may replace a UPC label of an original and often expensive item with a UPC label for another less expensive item. In such cases, a scan takes place but the wrong item is identified by the POS system. In this manner, the system will scan the item for a price that is substantially lower that the value of the item received by the customer.

Security system designers have attempted to develop techniques for detecting fraudulent or accidental operator error in use of POS terminals. The conventional systems in the field of detection of pass-through and sweethearting provide for the detection of abnormally long "scan-gaps." A "scan-gap" is the amount of time between consecutive scans at the point of sale terminal. When an item is passed through without scanning, the scan-gap increases until the next scan. By comparing the scan-gaps between scanned items of a transaction versus the average scan-gap for a given employee operator, the conventional scan-gap method seeks to identify incidents when an item has bypassed the scanner without being scanned.

The conventional scan-gap detection method is widely regarded to be impractical, as scan-gaps have been found to be a "noisy" measure at best. This is due to the fact that perfectly legitimate scan-gaps may vary widely due to delays such as those caused by weighing of produce, manual entry of unlabeled or un-scannable goods, and rescanning of items that did not get scanned on the first pass. As a result, scan-gaps are not a dependable metric and therefore conventional systems that attempt to use scan gaps as a method for detecting fraudulent activity are prone to problems.

In contrast, the system disclosed herein uses video data analysis techniques as will be explained to detect activity such as sweethearting or pass-throughs. In particular, the system disclosed herein detects incidents of theft or loss of inventory at the cash register, POS or other transaction terminal when an operator such as a customer or store employee passes one or more items around the scanner (or RFID reader) without being scanned, or when the operator scans or manually enters an incorrect code into the transaction terminal for an item. The system disclosed herein can also detect items which may be mislabeled with an incorrect bar code to be misread by the scanner or entered as the wrong item by the operator. Some embodiments utilize video analysis in conjunction with transaction scan data concerning items that were actually scanned by the POS terminal.

It is to be understood that point-of-sale terminals or cash registers that utilize scanning are only examples of transaction terminals and the system is not limited to detecting fraud in only retail environments. Additionally, scanning is not limited to laser scanning with a fixed scanner device, but can include handheld scanners, or Radio Frequency Identification (RFID) readers. The system is even applicable in situations where an operator manually enters a code or other item identification via a keyboard into the transaction terminal. The system disclosed herein is generally applicable to any environment where transaction data is available for comparison with video data associated with that transaction.

As an example, a system that utilizes RFID tags to identify items can benefit from the system disclosed herein. As an example, toll booth collection systems provide video data of vehicles traveling through the toll booths and provide for operators such as people, or automated scanners such as RFID vehicle transceiver reading systems, to collect toll fees from vehicles traveling on a highway. Fraud may occur is such systems, for example, if a vehicle is equipped with an improper transceiver (e.g. a truck is equipped with a car transceiver). Also, the terminal operator may refer to either store employee or customer, as in situations such as self-checkout transaction terminals.

More specifically, the system disclosed herein includes methods and apparatus for detecting a transaction outcome such as suspicious activity related to a transaction (e.g., purchase, refund, void, etc.) of items by a customer at a transaction terminal. The system obtains video data associated with a transaction area. The video data may be obtained, for example, from a camera positioned in close proximity to a cash register or other transaction area in a supermarket or other retail establishment.

The system applies an automated machine video analysis algorithm to analyze at least a portion of the video data to track (e.g. identify the presence of) items including activity indicative of item presence involved in a transaction in the transaction area. This process can automatically identify the presence of an item involved in the transaction from the video data analysis. This can be done, for example, by automatically detecting item activity in the transaction area and/or detecting operator activity in the transaction area. Detection of item presence can include detecting removal of an item from a region of interest in the transaction area and/or detecting introduction of an item into a region of interest in the transaction area.

In one configuration, a video transaction parameter is reduced to a video count of how many items the video analysis algorithm identified as having been processed by the operator in the transaction. As an example, an item is processed when an operator moves the item through the transaction area, whether or not the item was scanned or entered. Thus the video count can detect and count items that are both processed and scanned/entered and items that are processed, but not scanned/entered.

In another configuration, the video transaction parameter is a sequence of detection events produced from one or more detectors performing analysis of all or part of the video data. A detector is generally an automated image processing algorithm applied to a region of interest of the video data. For example, the video data may cover a large portion of the transaction area that includes the operator (e.g. store employee and/or customer), an item input region, a scan region, and an item output region. A detector can analyze all or a portion of this area, such as just the input conveyor belt region of the video data of a point of sale terminal. An image isolation and comparison process can be applied to frames of the video data for one or more regions of interest to detect the presence of an item being introduced or removed from this region of interest. When an item is detected in this manner, a detection event is produced indicating the presence of an item, time of detection, and other characteristics such as the size of the item. There may be more than one region of interest and the sequence of events may include many events from different detectors, or there may be a single detector producing a single set of events for just one region of interest. By analyzing the video data in this manner, the system is able to detect, from video analysis, the presence of individual items in the transaction. In some configurations, the system can determine how many items were visually processed in the entire transaction.

The system obtains at least one transaction parameter originated from the transaction terminal associated with the transaction area. The expected transaction parameter in one configuration is a transaction count or other item presence indication obtained from the transaction data produced by the transaction terminal (e.g. point of sale terminal). As each item is scanned or otherwise identified, data is sent from the scanner device to a processor in the transaction terminal. The system disclosed herein accesses this data (this can be done in various ways, as will be explained) either on a scan-by-scan basis, or as a collective set of data from a database, to determine the presence (and in some cases the identity) of a number of items processed by the transaction.

Using the combination of video analysis in comparison with transaction data, the system can determine if the presence of the item identified in the analysis of the video data has a corresponding presence in the transaction data, and if not, identifies the suspicious activity. As an example, for each detector, the system can compare the set of detection events for that detector to at least a portion of the transaction data to identify at least one apparent discrepancy in a number of items detected by that detector from a number of items indicated in the portion of transaction data. Transaction data such as transaction count (e.g. scan count) or transaction item identity thus represents the presence of an item or a number of items scanned (for an entire transaction), while the detection event data or video count from the video analysis represents the presence (or number) of items that the operator causes to move through the transaction area.

Receiving video data from a camera in close proximity to items provides additional benefits that result, in part, from obtaining higher resolution images and additional types of input. Wall-mounted or ceiling-mounted cameras, which are located beyond a close proximity, can be used in a fraud detection system, but the resolution of images from cameras that are not in close proximity to the transaction area can limit the functionality of some fraud detection methods.

In one embodiment, the system receives video data from one or more close proximity cameras that are positioned within a light post of a POS terminal. Light posts are commonly positioned at retail POS transaction areas as a way to indicate to customers that a transaction area is open, identify a numbered check-out register, etc. Positioning a camera in a light post provides a field of view that encompasses multiple areas of a transaction terminal, while still remaining in close proximity to the transaction area. In another embodiment, the system obtains video data from cameras positioned adjacent to or within a scanner device apparatus. For example, common apparatus for scanner devices includes optical recognition equipment recessed behind a window on a horizontal or vertical surface of a transaction counter. Positioning a camera in such a location enables high resolution image capture.

The system can also collect additional data from items coming within view of the camera. For example, obtaining video data can include collecting heat signatures of items, determining sizes and shapes of items, and identifying item orientation.

In another embodiment, the system disclosed herein includes methods and apparatus for detecting suspicious activity by obtaining video data from at least two video cameras that monitor a transaction area in close proximity to the transaction area. Receiving data from two different viewpoints enables precise shape and size recognition, as well as depth or distance from scanner apparatus. Another advantage of locating cameras in close proximity to an item scanning region is the ability to isolate a volume of space within which to analyze item and operator movement.

In another embodiment, the system includes a method for creating and maintaining an object model used for processing transaction data using video data obtained from close proximity cameras. The system receives visual imagery of items tracked across a transaction area of a point-of-sale terminal. The visual imagery is acquired from at least one video camera that monitors the transaction area, and that is positioned at a distance sufficiently close to the transaction area to visually distinguish each tracked item. The system also receives point-of-sale data corresponding to tracked items. Such point-of-sale data can include item identification numbers and related data. The system analyzes the visual imagery recorded for each tracked item within the transaction area to identify visual features of each tracked item, such as a color histogram or color/shape signature. The system stores visual features of each tracked item in an object model database to aggregate visual features of tracked items according to item identification number or other criteria. The object model database maintains an object model for each item identification number. With such automatic database creation, it is not necessary for retailers to manually photograph and organize new and changing items in a store. Many other embodiments are disclosed herein, details of which are provided in the detailed description section.

Other embodiments of the invention include any type of computerized device, workstation, handheld or laptop computer, POS or transaction terminal, or the like configured with software and/or circuitry (e.g., a processor) to process any or all of the method operations disclosed herein. The system may include the video camera(s) for obtaining the video, or the system may be a standalone computer that receives as input video data and scan data collected from one or more POS terminals in one or more retail locations. In other words, a computerized device or a processor that is programmed or configured to operate in any manner as explained herein is considered an embodiment of the invention. The system need not include the video camera and POS terminal, but instead may be an offsite computer system operated by a security service provider that receives the video and transaction data.

The processing may be done in real-time as the video and transaction data are collected to identify fraudulent or suspicious activity that may have just occurred (and may include notifying a security officer who can approach the operator and inspect the transaction items and receipt to determine if fraud has occurred), or alternatively, the processing may be done at some point after video and transaction data are collected for one or more transactions (i.e. may be post-processed). If post-processed, the identity of the operator can be maintained and tracked and a history of suspicious activities associated with that operator can be accumulated. During subsequent analysis of transactions for that operator (operators log into a POS terminal with a unique identity, and thus all transactions that the operator performs can be associated with that operator), the system disclosed herein can take into account the history for that operator to adjust a suspicion level assigned to the transaction outcome. Thus, an initial suspicion outcome may not be flagged as fraudulent, but if a second, third, fourth transaction outcome in a certain amount of time (e.g. over several hours, days, etc.) is detected for that same operator, the video associated with those transactions can be automatically identified and forwarded for review by another means, such as human review to confirm fraudulent activity is present.

In one configuration, transaction data is processed for many transactions from one or more POS terminals for one or more retails locations, and those transactions that are processed as explained herein that result in an indication of fraudulent or suspicious activity are flagged and the video data for only those transactions can then be further reviewed using other techniques, such as human review, to confirm the fraudulent or suspicious activity as initially identified by the automated (i.e. non-human or machine-based) processing explained herein. Further variations and alternative embodiments will be explained more fully in the detailed description section below.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments of the invention.

It is to be understood that the system of the invention can be embodied strictly as a software program, as software and hardware, or as hardware alone such as within a processor, or within an operating system. Example embodiments of the invention may be implemented within computer systems, processors, and computer program products and/or software applications manufactured by Stoplift, Inc. of Burlington, Mass., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

The system disclosed herein generally performs video counting or identification of items involved with transactions, as captured in video data, and compares this item identification information with transaction data obtained from a transaction terminal such as a point-of-sale register to identify situations that are suspicious and may indicate fraudulent activity or operator error. In particular, the system as disclosed herein utilizes unique camera positions, as well as possibly more than one camera, to perform robust detections of fraudulent or suspicious activities associated with transactions in the transaction area. By obtaining video data originating from at least one video camera that monitors a transaction area, the system can automatically (i.e. no human involvement needed) analyze the video data to track items involved in a transaction in the transaction area. Using this information, the system can compare the video analysis of the tracked items to transaction data produced from a transaction terminal to identify suspicious activity.

Figure 1:
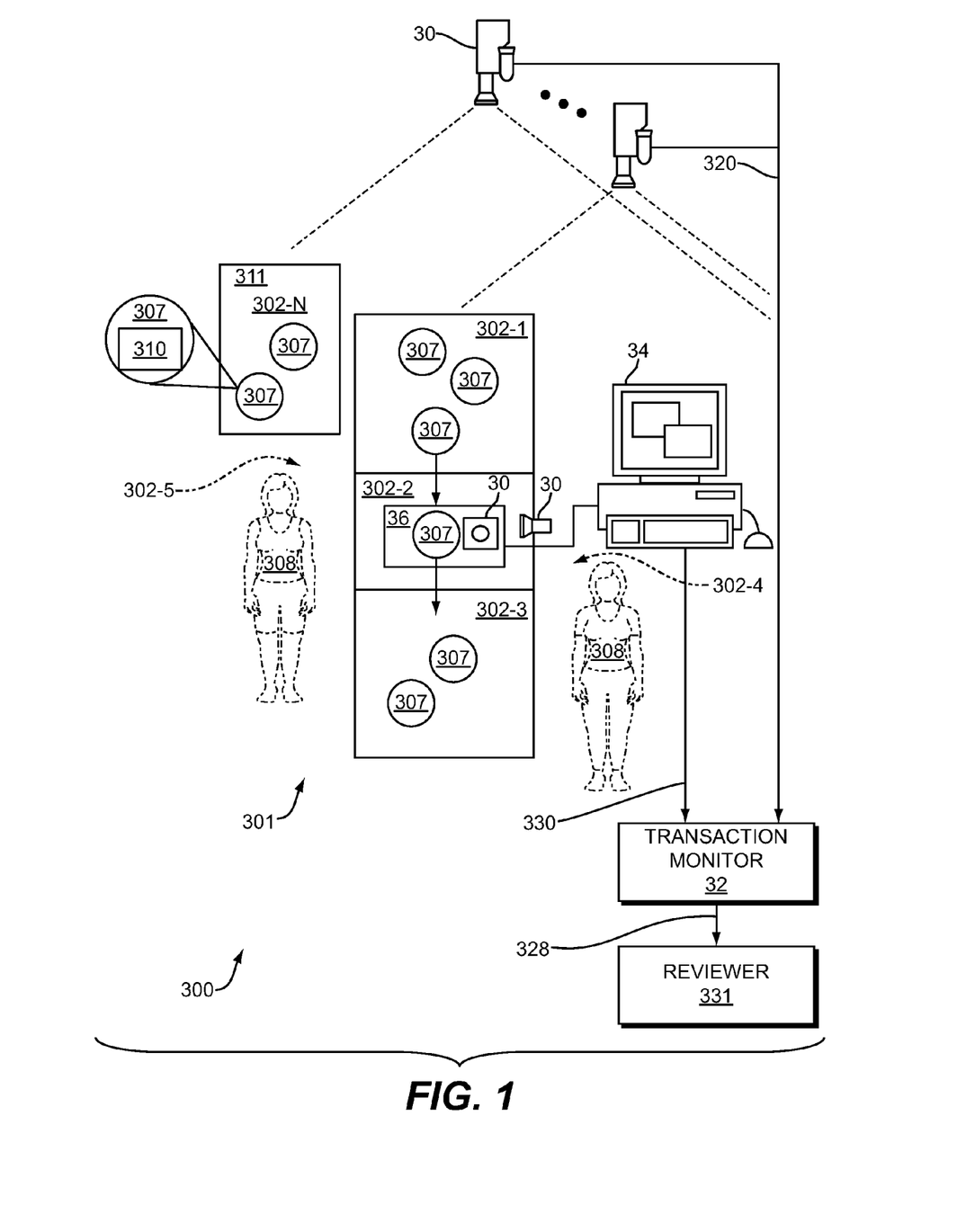
FIG. 1 illustrates an example configuration of a network environment that includes a video surveillance system and computer system configured with a transaction monitor configured as disclosed herein.

FIG. 1 is an illustration of an example environment 300 suitable for use in explaining example embodiment disclosed herein. Example environment 300 depicts a retail establishment in which customers 305 can purchase items 307. A transaction terminal 34 such as a point-of-sale terminal or cash register is under control of an operator 308 such as a store employee to allow the customer 305 to purchase the items 307. The transaction terminal 34 includes a scanner device 36 that is able to detect and scan or otherwise read item identities 310, such as SKU (stock keeping unit) or UPC (universal product code) barcode symbols or RFID tags affixed to each item 307 when those items 307 are brought within a predetermined proximity of the scanner device 36.

In a typical operation of the environment 300, the customer 305 approaches the transaction area 301 with a set of items 307 to be purchased. The items 307 may be contained, for example, with a shopping cart 311 or other item carrier transported by the customer 305 to the transaction area 301. Alternatively, the customer 305 may carry the individual items 307 to the transaction area 301. To make the purchase of the items 307, the customer 305 removes the items 307 from shopping cart 311 (or from their hands if carrying the items) and places the items into an item input region generally designated as region 302-1 within the transaction area 301. The item input region 302-1 may be a conveyor belt, countertop or other surface area onto which items to be purchased are placed prior to being detected and read by the scanner device 36 of the transaction terminal 34.

The operator 308, such as a store employee or cashier, interacts with the transaction terminal 34 by logging in or otherwise activating the transaction terminal 34. This process may involve the operator 308 providing a unique operator identity to the transaction terminal 34. During operation of the transaction terminal 34 by the operator 308, the body of the operator 308 generally remains within an operator region 302-4 of the transaction area 301. Once logged in, the operator 308 can begin selecting items 307 for purchase within the item input region 302-1, such as by picking up the individual items 307 by hand. The operator 308 passes each item 307 from the item input region 302-1 over the scanner device 36 generally located within an item read region 302-2. Assuming proper (i.e., non-fraudulent and non-error) operator operation, the operator 308 positions the item 307 such that the item identities 310 affixed to the item can be detected and scanned or read by the scanner device 36. In response to the scanner device 36 detecting an item identity 310 of the item 307 just scanned, the transaction terminal 34 registers the item 307 as an item to be purchased and usually produces a notification to the operator 308 such as a beeping noise or tone to indicate that the item 307 has been successfully identified. In response to the notification, the operator 308 moves the item 307 into the item output region 302-3 which may be another countertop, downstream conveyor belt or the like that holds items 307 that have been successfully scanned or read by or entered into the transaction terminal 34.

The operator 308 repeats this process for each individual item 307 such that all items 307 to be purchased are moved from the item input region 302-1, over or through the item read region 302-2 (during which scanning of the item takes place) and into the item output region 302-3. In some cases, items 307 may not contain an affixed item identity 310 such as fruit, vegetables or the like. In such cases, after removal of the item 307 from the item input region 302-1, the operator 308 manually enters the item identity into the transaction terminal 304 a keyboard or other manual input device to allow the transaction terminal 34 to register the item 307. In this manner, after all items 307 have been identified to the transaction terminal 34, the operator 308 can indicate to the transaction terminal 34 that the transaction is complete and the transaction terminal 34 calculates the total price of the items 307 to be purchased. The customer 305 then provides payment in that amount to the operator 308 and proceeds to remove the items 307 from the item output region 302-3 for transport out of the retail establishment.

As illustrated in FIG. 1, the environment 300 further includes a transaction monitor 32 configured in accordance with embodiments of the invention to detect suspicious activity related to a transaction. The environment 300 also includes a video source 30 such as one or more video cameras that capture video of the transaction area 301. In one configuration, the video source 30 is mounted in an elevated position sufficiently above the transaction area 301 to cover and capture video from the various regions 302. Alternatively, the video camera can be positioned in close proximity to the transaction area, such as close by to the region 302-2. In some configurations, the video camera 30 can be mounted within a scanner apparatus, such as behind a glass window of the scanner apparatus or nearby on a light post. In some configurations, there may be multiple cameras and cameras of different types (e.g. heat sensing, distance sensing, color sensing, and the like). By having one or more cameras in close proximity to the scanner area, detailed product images can be obtained that provide for useful features of the system disclosed herein. As an example, if more than camera is used within the scanner, such as a horizontally mounted camera and an upward facing camera, this can define two different view points and can isolate a volume of space through which a product may or may not pass during the transaction. Note that FIG. 1 illustrates video source 30 generally as video cameras. Subsequent figures will enumerate and discuss video cameras positioned in specific example locations.

The transaction monitor 32 in this example receives, as input, video data 320 from the video source 30 as well as transaction data 330 from the transaction terminal 34. While the example environment 300 illustrates the transaction monitor 32 as receiving a transaction data 330 and video data 320 directly from the video source 30 and the transaction terminal 34, it is to be understood that the transaction monitor 32 may receive these inputs in either real-time or any later time after processing of items or entire transactions by operator 308 is complete. Additionally, it is not required that the transaction monitor 32 receive the transaction data 330 and video data 320 directly from the video source 30 and transaction terminal 34. In an alternative configuration, these inputs can be received from a videotape machine (or from digital recorded media) or from the transaction database maintained by another computer system besides the transaction terminal 34. The video source 30 may thus be a real-time source such as a camera, or a delayed source such as a recording device such as a VCR or DVR. The transaction terminal 34 likewise may provide real-time transaction data directly from a POS device (e.g., cashier terminal or scanner) or the transaction data may be delayed data from a transaction log database in which POS data is stored.

In operation of the system disclosed herein, the transaction monitor 32 operates to identify suspicious activity associated with the transaction area 301 such as sweethearting or pass-through activities, by comparing the video data 320 and corresponding transaction data 330 in order to identify and report suspicious activity. Generally, this entails the transaction monitor 32 collecting video data 320 from the transaction area 301 including the transaction terminal 34 in which customers 305 purchase items 307 during a transaction. The video source 30, such as a camera, is preferably mounted in an elevated position above the transaction area 301 to allow video capture of regions 302 from above, though the system is not limited as such.

Generally, the transaction monitor 32 applies automated (i.e. non-human) video analysis to at least a portion or segment of the overhead video data 320 to detect the presence of at least one item 307 associated with the transaction. The transaction monitor 32 compares the presence of the item associated with the transaction from the video data (automatically detected by image processing techniques as explained herein) to transaction data 330 indicating items actually purchased by the customer at the transaction terminal (i.e. items 307 read or scanned by the terminal 34) to identify items in possession of the customer 305 that were not purchased at the transaction terminal (i.e. that were passed through the transaction area 301 without being scanned or entered into or read by the transaction terminal 34). The discrepancy between the presence of one or more items identified via automated processing of the video data 320 in comparison to items identified within the transaction data 330 indicates suspicious activity that the system disclosed herein can detect. The suspicious activity may be the result of operator error on behalf of the operator 308, or actual fraudulent activity that may include sweethearting or pass-throughs.

Depending upon the configuration, the transaction monitor 32 can analyze all or a portion of the video data captured from the transaction area to automatically detect items based on, for example, activity of objects that pass through the transaction area, activity of objects within a specific region of interest within the transaction area, activity of objects within a plurality of specific regions of interest within the transaction area, activity of objects entering into specific regions of interest within the transaction area and/or activity of objects exiting the specific regions of interest within transaction area.

Analysis of all or a portion of the video data produces, in one configuration, a set of detection events indicating detection of one or more items by at least one detector within at least one region of interest 302 of at least one portion of the video data. Depending upon the embodiment, the transaction monitor 32 can detect item detection from video analysis in only one region of interest 302, or in many regions 302. Notice in FIG. 1 that the transaction area 301 is divided or enumerated into several regions 302-1 through 302-N, including customer region 302-5. Each of these areas or regions can be considered a region of interest 302 and the video data 320 can capture activity in some, all or only one of these areas that may be indicative of an item involved in the transaction.

The transaction monitor 32 applies a detector to perform image processing in a region of interest. The detector is generally an image processing algorithm that can detect the presence of an item in that region. Item presence can be detected, for example, by applying a detector processing to the input item region 302. For each detector (one or more), the transaction monitor 32 compares the set of detection events for that detector to at least a portion of transaction data (i.e. the portion that contains transaction information that coincides with the video data) to identify at least one apparent discrepancy in a number of items detected by that detector from a number of items indicated in the portion of the transaction data. The transaction monitor 32 can identify an overall suspicion level for the transaction based on apparent discrepancies identified by the detectors(s).

In some configurations, video processing or analysis includes dividing the transaction area 301 into a plurality of regions (e.g. 302-1 and 302-3) through which objects move in sequence during at least a portion of a transaction. The transaction monitor 32 can perform automated video detection of an item as the items move through the plurality of regions in a sequence to obtain a pattern represented by one or more video parameters. The pattern thus represents video events of items that moved through the regions during all or part of a transaction. The transaction monitor 32 can obtain transaction data 330 identifying items detected by the transaction terminal 34 during the portion of the transaction that corresponds to the video data that is analyzed, and can automatically compare the video parameter to the transaction parameter by determining if the pattern representing video events of items from all or part of the transaction indicates a discrepancy from the transaction data identifying items detected by the transaction terminal during all or the same part of the transaction. If a discrepancy exists, the transaction monitor 32 identifies the transaction outcome to be a suspicious transaction.

By having different regions, sequences of different detection events can be used to identify existence of an item in the video data. In such cases, the transaction monitor 32 can concurrently compare sets of detection events from detectors with the transaction data to identify a discrepancy in a number of items processed in the transaction area. For example, performing automated video detection of the items can include identifying a removal event in item input region 302-1 that indicates the operator 308 has removed an item 307 from the item input region 302-1, and can also include identifying an introduction event in an item output area that indicates an operator has placed an item into the item output region 302-3. Thus, a sequence of events such as removal, introduction, removal introduction, and so forth can be produced from the video analysis if multiple regions of video data are monitored. This sequence can be time synchronized with transaction data indicating, for example, scans of items, so that a legitimate pattern appears as removal, scan, introduction, removal, scan, introduction and so forth, whereas a suspicious pattern might appear as removal, scan, introduction, removal, introduction. Notice the second scan event is not present, indicating a potential fraudulent or otherwise suspicious activity. By applying an automated machine-based video analysis technique to detect a video event of an item associated with the transaction area, and by comparing this with transaction data indicating transaction events of items associated with the transaction area, the transaction monitor 32 can determine if the video event is not identified as a transaction event in the transaction data, and in response, can identify a specific segment 328 of the video data that indicates where the video event is not identified as a transaction event exists.

As shown in FIG. 1, once suspicious activity is identified, the transaction monitor 32 can identify and transmit the specific segment of video data that indicates where the video event that is not identified as a transaction event exists (i.e. in the video clip 328) to a reviewer 331 to review the segment of video data 328 to review the suspicious activity of an operator with respect to purchase of items during the transaction.

In one configuration, the system disclosed herein provides an approach of actual counting of items or item detection events and is a more robust and accurate method of identifying incidents of items being passed through the transaction without being scanned. The system is unaffected by scan delays and since the system can determine that more items were part of a transaction than were scanned, the system can serve as a very clear indicator that theft or error on behalf of the operator has occurred.

Another kind of error, independent of item detection comparisons, is the misidentification of items. This may be due to fraud such as "ticket or label switching" where the barcode code or other item identity 310 may be overlaid with a bar code from lesser-priced item or "discounting" where the operator 308 intentionally manually enters a code or item identity into the transaction terminal 34 for a lesser-priced item. In one configuration, the system disclosed herein provides an approach of isolating the item images for comparison directly from video of typically performed transactions. In such configurations, the transaction monitor 32 can perform image comparison to determine if an image or visual features of an item associated with a detection event (e.g. an event indicating presence of an item in video data) substantially matches a previously stored image or visual features of an item. If the images or visual features do not substantially match, then the transaction monitor 32 can identify the transaction as potentially suspicious including a label-switching event indicating potential suspicious activity. Because this approach allows the operator 308 to handle the item 307 normally, it does not require alteration of the manner in which transactions are typically performed. The system also does not impact or slow down the operator's performance of the transaction. This is of particular importance to professional operators as they are assessed on their speed of performance. Because the operator is not asked to alter his or her behavior, the system can be put in place to detect dishonest employees without their knowledge that anything new has been put in place.

Now, more specifically, discussed below are a series of diagrams of various embodiments disclosed herein that relate to alternative camera view points, combinations of video data, and object model creation. It is to be understood that these are example embodiments provided to illustrate certain operations of certain configurations, and are not intended to cover all variations of the system disclosed herein.

Figure 2:
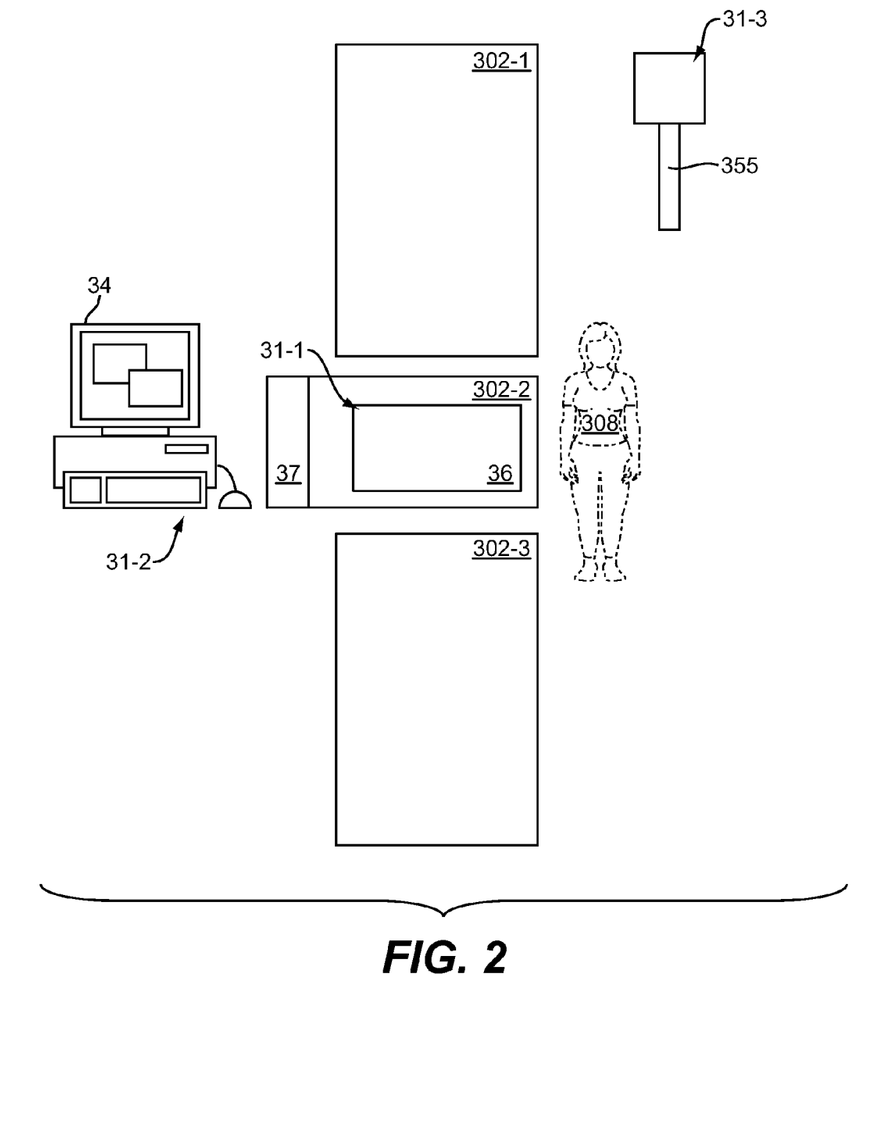
FIG. 2 illustrates alternative video camera locations in a transaction environment.

FIG. 2 is an illustration of a typical point-of-sale register region showing various possible camera placement locations. The transaction area is similar to transaction area 301 described above. Placement location 31-1 positions a video camera within or near scanner device 36. Scanner device 36 typically includes a light source and sensor located behind a translucent window. In such a scanner device 36, a video camera 30 can be positioned behind the window of the scanner device 36, and positioned to capture video in an upward or angled direction.

Placement location 31-2 positions a video camera near or within either transaction terminal 34, or scanner device 37. Scanner device 37 can be an optical light source reader and window apparatus that is mounted vertically instead of horizontally. Placement location 31-3 illustrates that a video camera can be mounted within or near a light post 355 or other pole associated with transaction terminal 34. Many conventional transaction areas include a light post for identifying numbered transaction terminals to customers.

Placement locations 31-1, 31-2, and 31-3 are all examples of locations to position a video camera in close proximity to transaction area 301. This close proximity can be contrasted with ceiling-mounted or wall-mounted cameras that are not in close proximity to transaction area 301. Thus, close proximity to transaction area 301 can be substantially closer than ceiling-mounted cameras. In some embodiments, cameras can be positioned within about a few feet of item read region 302-2. Such close proximity enables video cameras to capture higher resolution imagery of item and operator movement than a resolution that could be captured using ceiling-mounted cameras. Some retail establishments can have ceiling-mounted cameras that are located 10 or 20 or more feet above transaction area 301, which can reduce resolution of item images in that items are unclear or blurry.

In another embodiment, a camera can be position as part of a handheld portable scanner that can travel around or a distance from transaction area 301 to scan items.

Such "non-traditional" camera placement locations and positions offer unique views into the areas under surveillance, while still remaining compatible with the sweethearting detection methods and apparatus disclosed previously. These alternative camera placement locations can be hidden from operator view. For example, a video camera can be positioned behind a translucent window associated with a bar code scanner apparatus of the transaction area 301.

The sweethearting detection systems disclosed previously apply well to both traditional camera views (such as ceiling or wall-mounted cameras) as well as to various alternate and new camera positions. These cases include but are not limited to: positioning cameras in the horizontal portion of flatbed barcode scanners, positioning cameras in the vertical portion of flatbed barcode scanners, and positioning cameras in the light posts of a POS register system. Such camera locations can offer more detailed views of the items 307 and operators 308. Acquiring more video detail from the transaction process enables the application of complex reasoning about the objects in question, including the ability to detect to which object class an object or item belongs, and, in some instances, to identify the specific items themselves and to act on this data accordingly.

The following discussion describes several example camera setups, located in the previously mentioned placement locations, and how the sweethearting detections methods described previously can continue to be used in such environments. The following discussion will also describe various methods of detecting objects and suspicious behavior that may be specifically enabled by such alternative viewpoints. Note that the particular cases are given as examples of the variety of camera positions to which the previously disclosed sweethearting methods can be successfully applied. Such application includes, but is not limited to, these particular cases.

In addition to the various different locations cameras can be mounted, various camera modalities can also be used. Some of these include, but are not limited to, the use of infrared, thermal, or other heat-imaging cameras, and cameras able to deduce depth, such as those having a binocular camera arrangement and firmware capable of extracting depth information from a pair of cameras having two different viewpoints. Such cameras can be used, for example, in a scanner-mounted setup to aid in the detection of the operator, who would have a very different heat signature than the objects the operator would typically scan. Heat-sensing cameras can also aid in the detection, identification, and segmentation of refrigerated, heated, or ambient-temperature items as well, because each item can have a different heat signature. In some embodiments, cameras can be configured with a focal length that records transaction activity in focus that is less than a predetermined distance. For example, a camera positioned behind a window of a scanner device is configured with a focal length to focus on items less than about 1-2 feet from the window, or some other predetermined distance.

The various different types of camera functionalities can be used in different ways depending on where specifically a given camera is mounted. The following sections outline several such places and describe how sweethearting is identified under each view. When relevant, discussion of these alternative camera modalities and how they can be used within the context of the camera shot will be explained.

Figure 3A:
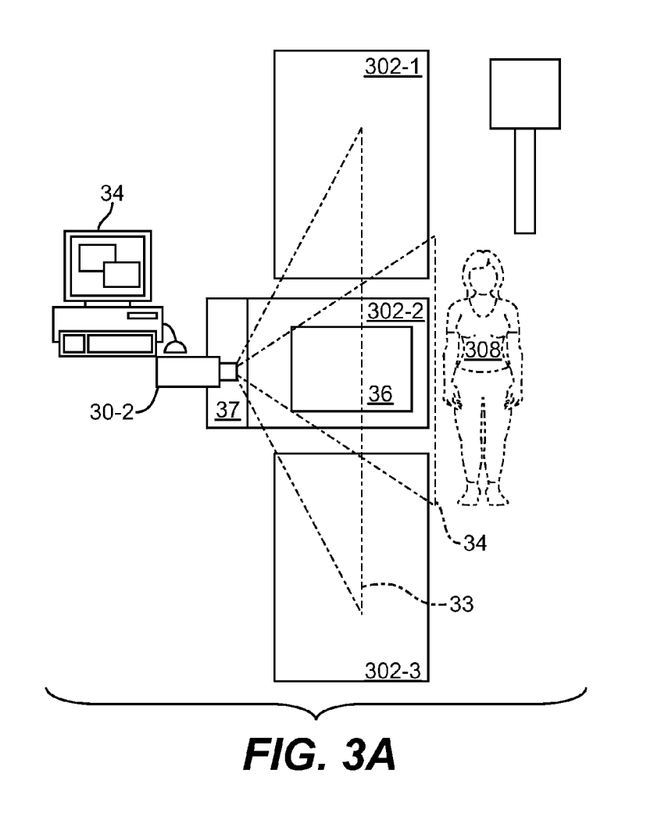
FIGS. 3A and 3B illustrate horizontally positioned video cameras in a transaction environment.

FIGS. 3A and 3B illustrate one or more cameras mounted within or near a vertically disposed barcode scanner device 37, such as typical flatbed scanners found in many grocery stores and other retail establishments. FIG. 3A includes two camera shots, fields of view, or areas of acquiring video data using video camera 30-2. Field of view 33 shows that video camera 30-2 obtains video images from a wide angle including all of regions 302-1, 302-2, and 302-3, and including the incoming belt region, outgoing belt region, register region, and scanner region. Field of view 34 shows that video camera 30-2 obtains video images from a more traditional field of view. Both fields of view 33 and 34 cover the area of the register region pertinent to detecting sweethearting and other methods of operator fraud and operator error. Typically, this is item read region 302-2.

Figure 3B:
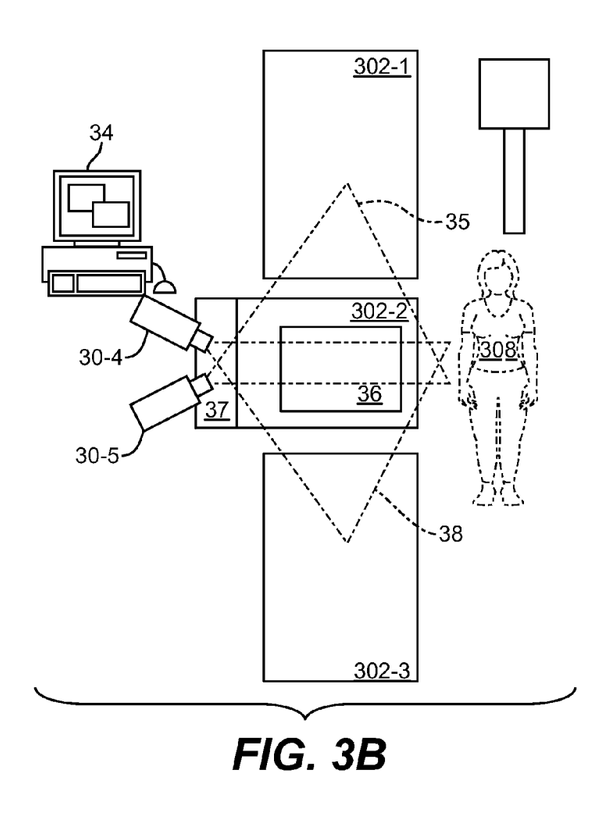

FIG. 3B shows another embodiment in which multiple cameras are positioned within or near the scanner device 37, in order to acquire multiple, possibly overlapping fields of view. For example, field of view 35 acquired from video camera 30-5 overlaps with field of view 38 acquired from video camera 30-4 of the point-of-sale register region. Both fields of view 35 and 38 capture images of item and operator movement within item read region 302-2.

Sweethearting detection methods described previously, such as those methods used with a ceiling or wall mounted camera, can be applied to alternative camera locations and imaging viewpoints. The basic setup, described previously to detect sweethearting, included views of the operator 308, one or more object regions, such as the item input region 302-1 or item output region 302-2, and views of the items 307. In a scanner-mounted, or light post-mounted camera, all such regions are visible. Thus images acquired from these camera locations can be used as video data 320 used by transaction monitor 32 of the sweethearting detection system described previously.

In scanner-mounted camera embodiments, the different regions would include an input region, an operator region, and an output region. Unlike in overhead camera shots, the object layer for the input region would not be focused solely on the belt, but can acquire images of things situated behind the belt in question such as a POS device or a magazine rack. Similarly, the output region background could contain other colors from the background or POS systems. The object layer is updated for every frame in which operator pixels are not present. An operator region is a region that includes any scanner pixels as well as pixels that represent an area above the scanner. In this region, very little background history is used to model the background of the operator region. In one such embodiment, a pure motion image map can be used. To detect operator pixels, the foreground image is differenced from the corresponding background regions.

Once the silhouettes of objects, operator, and those determined to be noise, are extracted, the detection algorithms proceed as usual. For example, anytime operator pixels, i.e. pixels that are connected to the operator region, are detected entering and then leaving regions, a key frame of those regions is stored. Then corresponding enter and exit key frames are differenced.

Transaction monitor 32 uses modified methods of data analysis when different camera views are deployed to detect suspicious activity. For example, rules governing the update of background and object layer models are modified to take into consideration perspective camera shots. Unlike in an overhead perspective, the portion of the video image contains the input region, may contain a point-of-sale device or a magazine rack rather than a solid color belt. Certain image processing techniques can be deployed to help disambiguate foreground objects from the background. For example, it is not possible to model the background as a single (belt) color. Thus, taking the segmentation into account, the background can be updated on a per-pixel or per-region basis, depending on whether the segmentations indicate that the background is currently visible or not.

Figure 4:
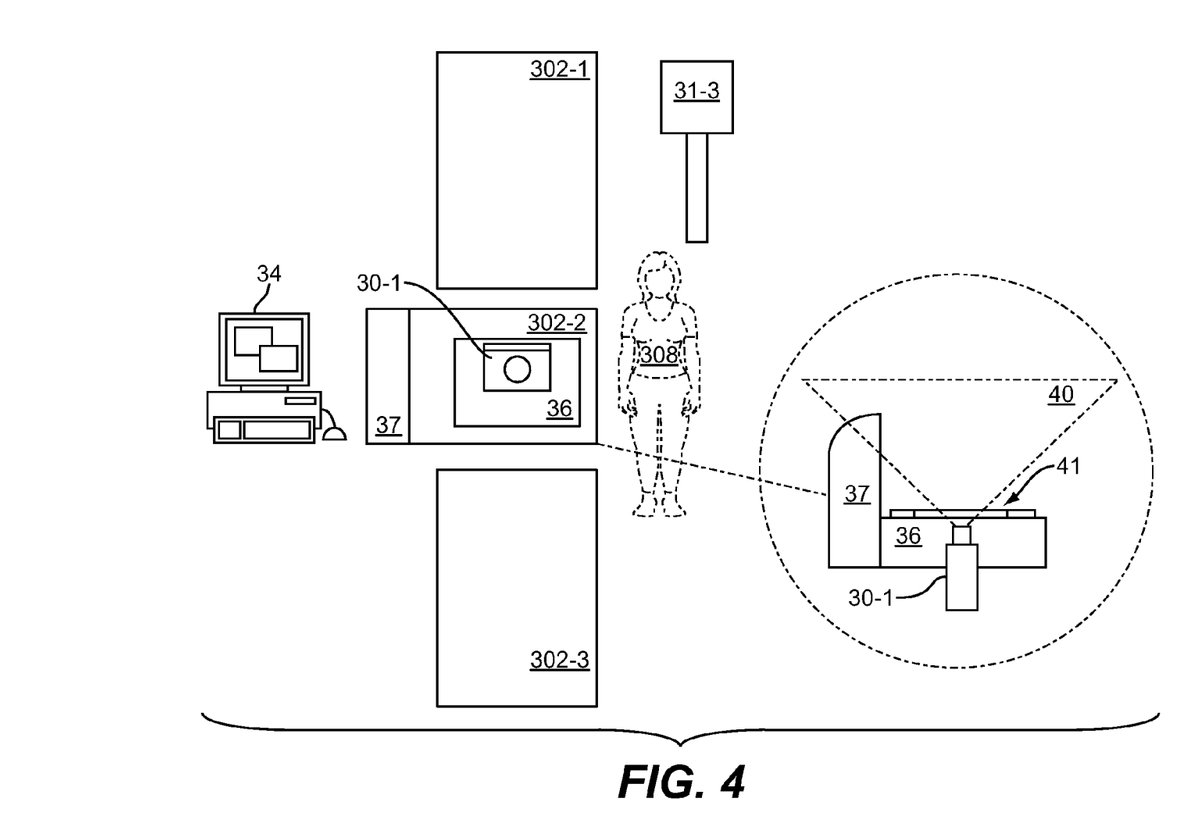
FIG. 4 illustrates a video camera positioned within a scanner device apparatus.

FIG. 4 illustrates a camera 30-1 mounted within or near a horizontally disposed barcode scanner device 36. For example, video camera 30-1 is mounted underneath window 41 of scanner device 36. Such positioning of camera 30-1 provides views of the incoming belt region, outgoing belt region, register region, scanner region, and operator region, and is thus located in close proximity to item movement across scanner device 36.

Previously described sweethearting detection methods are also applicable to images captured using video camera 30-1, including those methods described in the patent application incorporated herein by reference.

Video camera 30-1 obtains video imagery from field of view 40. While the illustration of field of view 40 shows an angled field of view that might miss some areas of item input region 302-2, embodiments can be modified to acquire video imagery from all of item read region 302-2. In other embodiments, such a view combined with a narrow-angle lens precludes views of the belt regions such as regions 302-1 and 302-3. In these other embodiments, only a volume of space directly above the scanner device 36 is immediately visible.

To detect sweethearting in an embodiment with a restricted view involves detection of the presence or absence of objects from the field of view 40 of the video camera 30-1 and, possibly, a trajectory or travel of such objects. For example, in one embodiment, video camera 30-1 is positioned in the scanner device 36 facing upwardly and having a narrow field of view 40. Thus, only a view of the space immediately above the scanner device 36 is transmitted to transaction monitor 32. One side of the scanner device 36 is identified as the input side and the opposite side is identified as the output side. The motion of a scene directly visible by video camera 30-1 is extracted at every frame. First, transaction monitor 32 examines the motion signature to detect the presence or absence of objects. Once one or more objects are identified, their direction of travel, relative to the predetermined input and output directions is deduced. Motion indicative of an object traveling from the input to the output region of the space directly above the scanner device 36 is indicative of a "scan-like motion," regardless of whether a scan was actually registered by the POS, such a motion is recorded as a detection. If no corresponding scan event is registered, then this is indicative of suspicious activity and the event is flagged.

In another embodiment, camera 30-2 can be used simultaneously with camera 30-1. In such a configuration, transaction monitor 32 obtains video data from camera 30-2 positioned to record video data in an approximate horizontal direction, and also obtains video data from camera 30-1 that is positioned to record video data in an approximate vertical direction.

Other embodiments include various permutations of object detectors and trajectory analyzers. For instance, object detection can be performed by extracting features from each frame of video, wherein the features indicate the presence or absence of objects. For example, such features can be the output of background subtraction methods, in which case the features would be silhouettes representing areas in the imagery different from the background (which, in this embodiment, would be the typical view of space directly above the scanner). Embodiments can also include a depth signal or signature, coming from video camera 30-1 capable of extracting depth information from the scene, or from a heat-sensing camera that records a temperature signature.

Trajectory analyzers can include a null-analyzer, in which case no trajectory information is used in determining the direction the aforementioned object is traveling by using optical flow techniques, point-feature tracking approaches, etc.

Other embodiments include combined upward-facing and side-facing shots from the scanner devices 36 and 37. Mounting video cameras in both locations offers unique opportunities to detect more specific methods of sweethearting. In an embodiment that uses a pair of video cameras with one upward facing camera and one sideward facing camera enable transaction monitor 32 to analyze a volume or cube of space to be imaged simultaneously to give depth, height, and width information about an object passing over the scanner. The volume of space can be less than a predetermined volume. For example, transaction monitor 32 isolates transaction activity within a region directly adjacent to a window of scanner device 36, such as by using a narrow-angle camera lens.

Such a combined perspective of video camera viewpoints allows transaction monitor 32 to determine whether an object is being passed around or above the scanner region. For example, by detecting motion of the object in the upward-facing camera, the presence of an item can be detected. However, if the sideward-facing camera sees no corresponding motion signature, then transaction monitor 32 can deduce that the object is being passed up and over the scanner, indicating suspicious activity such as to prevent transaction terminal 34 from recording an item identity. Thus, in some cases transaction monitor 32 identifies suspicious activity from video data from one camera only, and in other situations transaction monitor 32 can identify suspicious activity from video data obtained from both cameras.

Likewise, if the sideward-facing camera detects the presence of an item, through a visual signature such motion, temperature, object feature identification, or through some other means, then system can deduce an object is present. However, if no such presence is detected in the upward facing camera, then transaction monitor 32 can identify that operator 308 intentionally passed the object around the scanner, which is another method of sweethearting.

Having video cameras positioned in close proximity to object being scanned (as opposed to ceiling mounted cameras) provides advantages. In addition to functionality to detect sweethearting, such close-up perspectives of the point-of-sale system—specifically of the items to be purchased—enable further investigative techniques and the detection of other modes of fraud and operator error.

One such additional example of fraud is of label-switching. Label-switching includes actions in which operator 308 scans, keys-in, or otherwise enters, the item 307 to be rung up as a different item that is usually far less-costly. Some examples include ringing up steak as celery, or inputting costly baby food as less costly canned goods.

Transaction monitor 32 detects label switching methods by identifying the object, object class, or department to which the item in question belongs. For example, an item, such as a steak, may be identified as a "meat" or "deli" item, and the item description actually rung up may incorrectly correspond to a "packaged item" or "produce" department. In another embodiment, transaction monitor 32 analyzing video data 320 from the two different view points to identify transaction activity that includes multiple stacked items passing across an item scanner without receiving item identification from a point-of-sale terminal 34 for each stacked item passing across scanner device 36.

There are various methods of determining a class or department to which an item belongs. For example, a "department" category can be modeled by gathering a database of imagery of objects belonging to the department. Various features of those items' imagery are extracted, such as corner features, color histograms, edges, orientation histograms, size, temperature (in the case of IR-sensing cameras), etc. These item features, in turn, can be clustered, saved, or otherwise evaluated to form a model of that particular class of object. Each such model can be computed and associated with the various departments.

In one embodiment, transaction monitor 32 can automatically create and maintain an object model of items tracked using the imagery of each item by analyzing imagery of each item to identify and store visual features of each item according to item identification numbers. Transaction monitor 32 can compare visual features of a given tracked item to visual features of an object model associated with an item identification number of the given tracked item, such as a SKU. Then transaction monitor 32 can identify transaction activity as suspicious when the given tracked item has visual features different than visual features in the object model associated with the item identification number of the given tracked item.

Equipped with access to such models, transaction monitor 32 detects label-switching by determining to which department the item within the field of view of the camera belongs, identifying from transaction log data for the department to which the actual scan belongs, and determining if the item and scan information are the same.

In another embodiment, a similar approach operates on the item-level, rather than at the more broad, category or class-level. For example, the same approach can be used to model individually identifiable objects, instead of classes of objects. Identifying individual objects can be considered as a generalization of the category-based approach, in which every individual object is its own category. One or more images of each object to be identified can be used to build the model of that item, and each such model is used in the comparison.

Detecting label-switching in the above-mentioned scenario involves detecting the actual identity of the item in the video, identifying the identity of the item rung up (for example, by looking at the SKU of that item in the transaction log (Tlog) data), and determining if they are the same. If the two are different, then such a difference indicates a label-switching scenario.

In another embodiment, transaction monitor 32 automatically includes item features in the Tlog. Object identification enables more than just detecting instances of label-switching. Object identification can also be used to aid the operator in scanning difficult-to-scan items. Many times, an operator will abandon trying to scan an item rather than waste more time trying unsuccessfully to get a scanner to recognize a barcode on a troublesome item. This could be due to either a lazy or careless operator, or a diligent operator who does not wish to further frustrate customers waiting in line. Regardless of the underlying cause, transaction monitor 32 can detect the identity of the object, associate the identity to a specific SKU in the system's database of SKUs, and automatically enter the item as if the barcode scanner itself scanned it.

Figure 5:
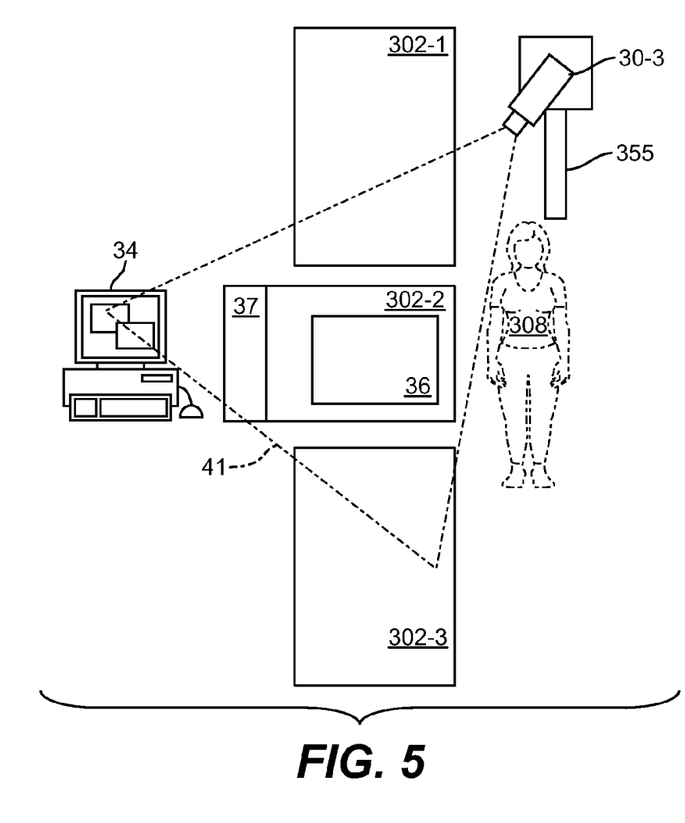
FIG. 5 illustrates a video camera positioned in a light post of a point-of-sale transaction terminal.

FIG. 5 illustrates video camera 30-3 positioned near or within light post 355. Light post 355 is located in close proximity to or adjacent a transaction area, such as point-of-sale terminals found in many grocery stores and other retail establishments. Such placement of video camera 30-3 offers field of view 41 that includes the item input region 302-1, item read region 302-2, and item output region 320-3, transaction terminal 34, scanner devices 36 and 37, and operator 308. Thus, video camera 30-3 can obtain video data from multiple regions of transaction area 301. Transaction monitor 32 can use Sweethearting detection methods described previously with video data from video camera 30-3. Note that video camera 30-3 does not need to be located in a light post 355 that is associated with transaction area 301, but can be associated with an adjoining or adjacent transaction area. In some configurations of transaction areas, an adjoining light post, for example, provides a better or less obstructed view of belt regions.

Figure 6:
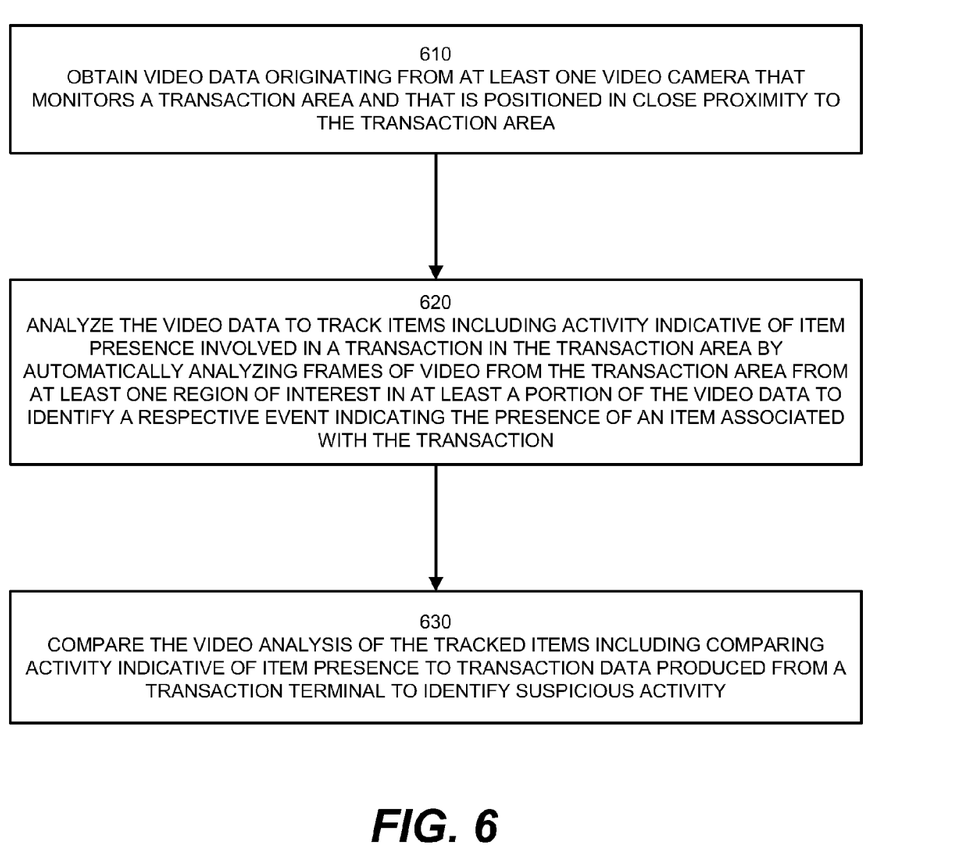
FIG. 6 is a flow chart of operation of one configuration of processing of the transaction monitor to detect suspicious activity.

FIG. 6 is a flow chart of an example process for identifying suspicious activity. In step 610, transaction monitor 32 obtains video data 320 originating from at least one video camera 30 that monitors transaction area 301 and that is positioned in close proximity to the transaction area 301. The video data can capture color, size, orientation, distance, heat signature, and other data associated with items 307. In step 620, transaction monitor 32 analyzes video data 320 to track items 307 including activity indicative of item presence involved in a transaction in the transaction area 301 by automatically analyzing frames of video from the transaction area 310, and from at least one region of interest in at least a portion of the video data to identify an event that indicates a presence of item 307 associated with the transaction. In step 630, transaction monitor 32 compares the video analysis of the tracked items 307 including comparing activity indicative of item presence to transaction data 330 produced from transaction terminal 34 to identify suspicious activity.

Figure 7:
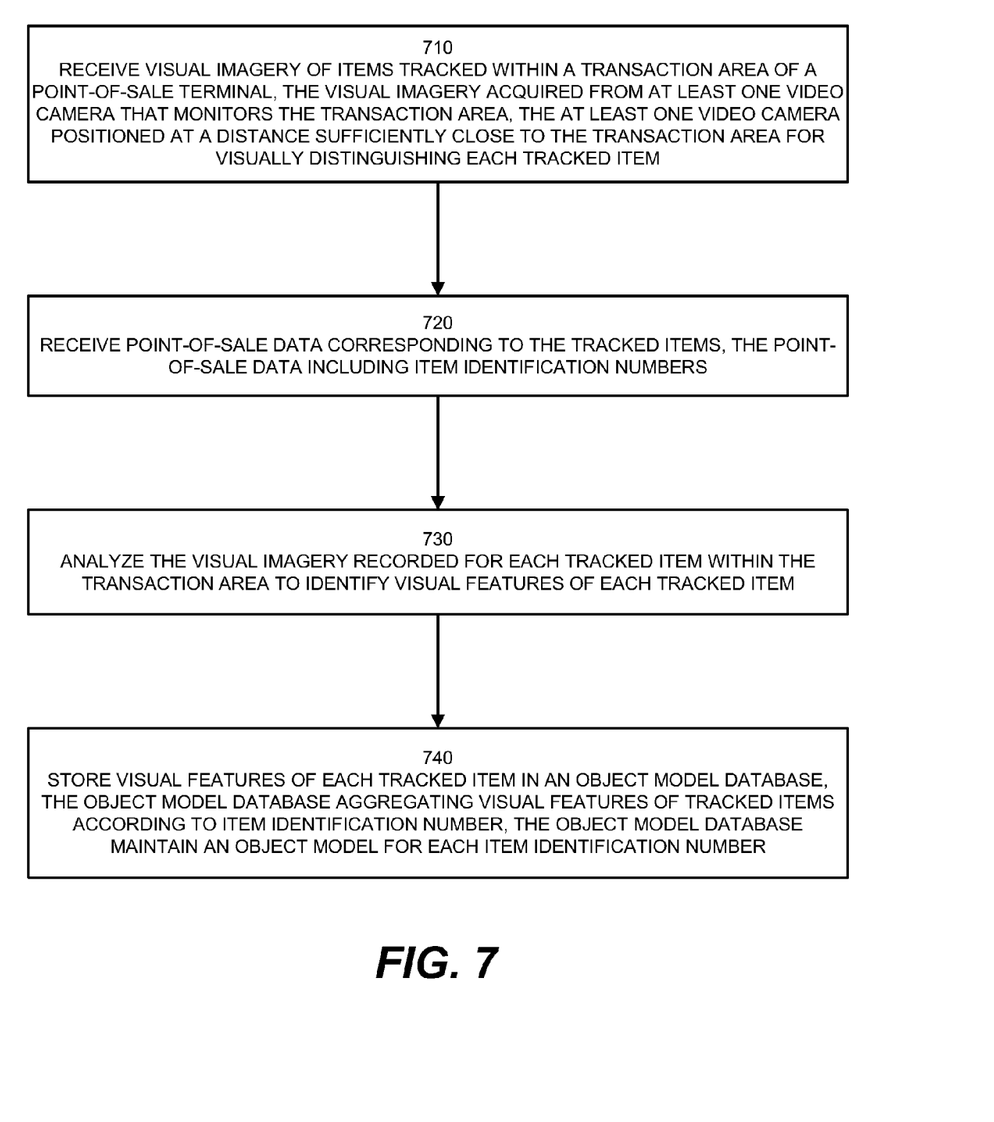
FIG. 7 is a flow chart of operation of one configuration of processing of the transaction monitor to create and maintain an object model database.

FIG. 7 is a flow chart of an example process for creating, maintaining, and updating an object model database. In step 710, transaction monitor 32 receives visual imagery of items 307 tracked within transaction area 301 of a point-of-sale terminal 34, the visual imagery acquired from at least one video camera 30 that monitors the transaction area 301. The at least one video camera 30 is positioned at a distance sufficiently close to the transaction area 301 for visually distinguishing each tracked item 307. Tracking items within transaction area 301 can include items scanned or read by a portable scanner that can travel to a customer region 302-5 of the transaction area 301. For example, some large items 307 for purchase may remain in cart 311 while operator 308 travels to customer region 302-5 to scan items.

In step 720, transaction monitor 32 receives transaction data 330 corresponding to the tracked items 307, the transaction data 330 including item identification numbers, such as item identities 310.

In step 730, transaction monitor 32 analyzes the visual imagery recorded for each tracked item 307 within the transaction area 301 to identify visual features of each tracked item 307.

In step 740, transaction monitor 32 stores visual features of each tracked item 307 in an object model database. The object model database aggregates visual features of tracked items 307 according to item identity 310. For example, the transaction monitor can receive a plurality of scans of various items during different transactions, and use each scan time image to update a model of how a given item should appear. There are several available methods for imaging modeling that transaction monitor 32 can use. The object model database maintains an object model for each item identity 310. For example, for a given brand and type of breakfast cereal, the object model database stores a color histogram of coloring associated with the box, and an approximate size of the cereal box.

In another embodiment, transaction monitor 32 receives visual imagery for a given item having a new item identification number, and then creates a new object model in the object model database to store visual features of the given item having the new item identification number. For example, a new flavor of breakfast cereal appears on grocery store shelves. Upon a scanning a box of the new breakfast cereal, transaction monitor 32 obtains visual imagery and creates a new object model for the new box of cereal. Upon receiving imagery for subsequent identical boxes, transaction monitor 32 improves the object model by aggregating visual features extracted from each visual image of the subsequently scanned boxes. Since operators hold items 307 being scanned in various orientations, collecting imagery from hundreds or more scans improves the accuracy of a given object model.

In another embodiment, transaction monitor 32 identifies visual features for a given item in the transaction area 301. The given item has an identification number and the object model database has an existing object model corresponding to the identification number of the given item. The transaction monitor 32 then compares visual features for the given item with the existing object model, and, based on the comparing, identifies a mismatch between the visual features for the given item and visual features associated with the existing object model.

In another embodiment, transaction monitor 32 identifies multiple subsequent mismatches between the visual features for the given item and visual features associated with the existing object model. Upon identifying multiple subsequent mismatches that exceed a predetermined number of mismatches, the transaction monitor 32 creates a new object model associated with the item identification number, thereby automatically updating the object model database. Alternatively, transaction monitor 32 can identify the mismatch between the visual features for the given item and visual features associated with the existing object model as suspicious.

In another embodiment, transaction monitor 32 continually updates existing object models using subsequently received visual imagery of items tracked within the transaction area. Cameras can lose their color recognition abilities over time, and/or can have their color recognition capabilities gradually shift among colors. Moreover, many retail establishment can have many cameras capturing visual imagery. Each camera can gradually degrade in capabilities. Thus transaction monitor 32 can continually update existing object models with each subsequent image captures. Transaction monitor 32 can update object models using several different techniques. For example, with each new image captured, transaction monitor 32 discards the oldest image in a model. Alternatively, transaction monitor 32 can use time limits or filters for updating using subsequent scan time images. Transaction monitor 32 can link updates to an identification process. For example, if item imagery from scan time matches an object model within a predetermined threshold, than transaction monitor 32 uses the new scan time image to update the object model. Alternatively, transaction monitor 32 updates object models with each additional scan time image irrespective of whether the image matches an existing model. In some embodiments, the amount of outlier images is so small that adding mismatched visual imagery to an object model does not substantially affect accuracy.

In another embodiment, transaction monitor 32 receives visual imagery of items tracked that includes receiving visual imagery that represents a portion of the item. This portion of the item is less than imagery of an entire item. For example, many items are too large for a close proximity video camera to acquire an image of the entire item. In some embodiment, the video camera can only capture an image of the item immediately around a barcode. With such large items, or items in which the video camera acquired only a portion of the item, analyzing the visual imagery includes analyzing visual imagery of the portion of the item to identify visual features for storing in the object model database. It is also common with large item to use a handheld or portable scanner to read an item identification, and so a scan time image of such an item would be limited.

In another embodiment, transaction monitor 32 uses the visual object recognition process to assist operators. In such an embodiment, transaction monitor 32 receives visual imagery for a given item tracked across the transaction area of the point-of-sale terminal without receiving point-of-sale data that corresponds to the given tracked item, and that includes an item identification number of the given item. For example, a bar code label on a box of cereal is smudged and not capable of being identified by a bar code scanner. Transaction monitor 32 compares visual features of the given item with object models in the object model database and displays a list of items for operator selection, the list of items having visual features similar to visual features of the given item. In the example of the cereal box, transaction monitor 32 might display a list of several cereal boxes having similar visual features so that the operator can select the correct item identification.

While the system and method have been particularly shown and described with references to configurations thereof, it will be understood by those skilled in the art that various changes in form and details may be made therein without departing from the scope of the invention encompassed by the appended claims. Accordingly, the present invention is not intended to be limited by the example configurations provided above.

What is claimed is:

1. A method of detecting suspicious activity, the method comprising:
   obtaining video data originating from at least one video camera that monitors a transaction area and that is positioned in close proximity to the transaction area, wherein obtaining video data originating from the at least one video camera that monitors the transaction area includes obtaining imagery of individual items tracked within the transaction area;
   analyzing the video data to track items including activity indicative of item presence involved in a transaction in the transaction area by automatically analyzing frames of video from the transaction area from at least one region of interest in at least a portion of the video data to identify a respective event indicating the presence of an item associated with the transaction;
   comparing the video analysis of the tracked items including comparing activity indicative of item presence to transaction data produced from a transaction terminal to identify suspicious activity; and automatically creating and maintaining an object model of items tracked using the imagery of each item, wherein creating the object model includes analyzing imagery of each item to identify and store visual features of each item according to item identification numbers.

2. The method of claim 1 wherein obtaining video data originating from at least one video camera that monitors a transaction area and that is positioned in close proximity to the transaction area includes obtaining video data having a higher resolution than video data obtained from a ceiling mounted camera.

3. The method of claim 1, wherein obtaining video data originating from at least one video camera includes obtaining video data from the video camera positioned in a light post adjacent to the transaction area to capture video data from multiple regions of the transaction area.

4. The method of claim 1, wherein obtaining video data originating from at least one video camera includes obtaining video data from the video camera hidden from operator view.

5. The method of claim 4, wherein obtaining video data originating from at least one video camera includes obtaining video data from the video camera positioned behind a window associated with an item scanner apparatus of the transaction area.

6. The method of claim 1, wherein obtaining video data originating from at least one video camera includes isolating transaction activity within a region directly adjacent to a window of an item scanner apparatus, the item scanner apparatus identifying an identity of items.

7. The method of claim 6, wherein isolating transaction activity within the region directly adjacent to the window of the item scanner apparatus includes obtaining video data using a narrow angle camera lens.

8. The method of claim 6, wherein isolating transaction activity within the region directly adjacent to the window of the item scanner apparatus includes obtaining video data from the video camera positioned behind the window of the item scanner apparatus and configured with a focal length that records transaction activity in focus that is less than a predetermined distance.

9. The method of claim 1, wherein comparing the video analysis of the tracked items comprises:
   comparing visual features of a given tracked item to visual features of an object model associated with an item identification number of the given tracked item; and
   identifying transaction activity as suspicious when the given tracked item has visual features different than visual features in the object model associated with the item identification number of the given tracked item.

10. A computer-implemented method for creating and maintaining an object model used for processing transaction data, the computer-implemented method comprising:
   receiving visual imagery of items tracked within a transaction area of a point-of-sale terminal, the visual imagery acquired from at least one video camera that monitors the transaction area, the at least one video camera positioned at a distance sufficiently close to the transaction area for visually distinguishing each tracked item;
   receiving point-of-sale data corresponding to the tracked items, the point-of-sale data including item identification numbers;
   analyzing the visual imagery recorded for each tracked item within the transaction area to identify visual features of each tracked item; and
   storing visual features of each tracked item in an object model database, the object model database aggregating visual features of tracked items according to item identification number, the object model database maintain an object model for each item identification number.

11. The method of claim 10, wherein receiving visual imagery of items tracked across a transaction area includes:
   receiving visual imagery for a given item having a new item identification number, creating a new object model in the object model database to store visual features of the given item having the new item identification number.

12. The method of claim 10, wherein analyzing the visual imagery recorded for each tracked item within the transaction area to identify visual features of each tracked item includes:
   identifying visual features for a given item in the transaction area, the given item having an identification number, the object model database having an existing object model corresponding to the identification number of the given item;
   comparing visual features for the given item with the existing object model;
   based on the comparing, identifying a mismatch between the visual features for the given item and visual features associated with the existing object model.

13. The method of claim 12, further comprising:
   identifying multiple subsequent mismatches between the visual features for the given item and visual features associated with the existing object model; and
   upon identifying multiple subsequent mismatches that exceed a predetermined number of mismatches, creating a new object model associated with the item identification number.

14. The method of claim 12, further comprising:
   upon identifying the mismatch between the visual features for the given item and visual features associated with the existing object model, identifying an event associated with the given item as suspicious.

15. The method of claim 10, further comprising:
   continually updating existing object models using subsequently received visual imagery of items tracked within the transaction area.

16. The method of claim 15, further comprising:
   receiving visual imagery for a given item at a time of a failed attempt to read an item identification number associated with the given item, the given item having an existing item identification number and a corresponding object model in the object model database;
   comparing visual features from the received visual imagery of the given item with object models in the object model database; and
   displaying a list of one or more items for operator selection, the list of one or more items including one or more potential matches to the given item, the potential matches having visual features similar to visual features of the given item.

17. The method of claim 10, wherein receiving visual imagery of items tracked includes receiving visual imagery that represents a portion of the item, wherein the portion of the item is less than imagery of an entire item; and
   wherein analyzing the visual imagery includes analyzing visual imagery of the portion of the item to identify visual features for storing in the object model database.

18. The method of claim 10, further comprising:
   receiving visual imagery for a given item at a time of a failed attempt to read an item identification number associated with the given item, the given item having an existing item identification number and a corresponding object model in the object model database;

comparing visual features from the received visual imagery of the given item with object models in the object model database; and displaying a list of one or more items for operator selection, the list of one or more items including one or more potential matches to the given item, the potential matches having visual features similar to visual features of the given item.

* * * * *